No. 701,999. Patented June 10, 1902.
J. W. FARLEY.
NON-CONDUCTING COVERING FOR PIPE FITTINGS OR JOINTS.
(Application filed Jan. 18, 1902.)
(No Model.)
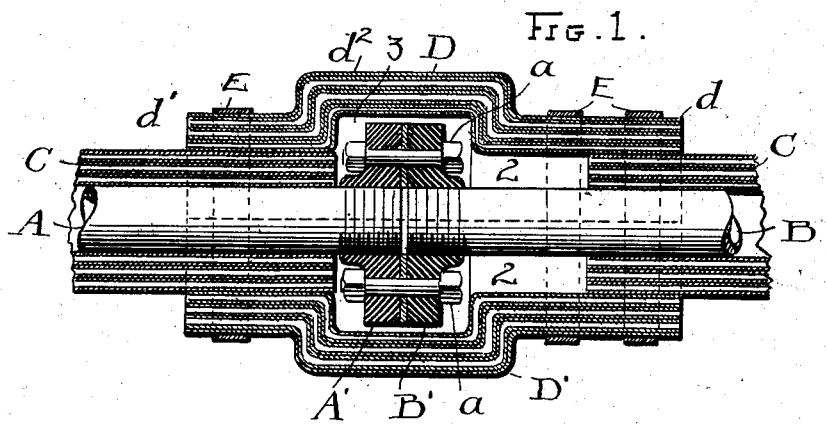
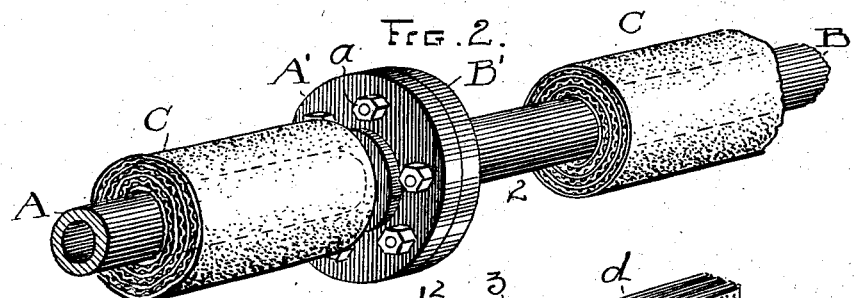
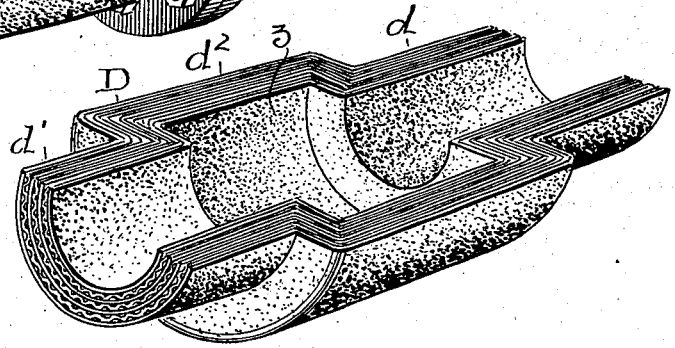
ATTEST
R. B. Moser
T. M. Madden
INVENTOR
JOHN W. FARLEY.
BY
H. T. Fisher
ATTY

UNITED STATES PATENT OFFICE.

JOHN W. FARLEY, OF CLEVELAND, OHIO.

NON-CONDUCTING COVERING FOR PIPE FITTINGS OR JOINTS.

SPECIFICATION forming part of Letters Patent No. 701,999, dated June 10, 1902.

Application filed January 18, 1902. Serial No. 90,278. (No model.)

*To all whom it may concern:*

Be it known that I, JOHN W. FARLEY, a citizen of the United States, residing at Cleveland, in the county of Cuyahoga and State of Ohio, have invented certain new and useful Improvements in Non-Conducting Coverings for Pipe Fittings or Joints; and I do declare that the following is a full, clear, and exact description of the invention, which will enable others skilled in the art to which it appertains to make and use the same.

My invention relates to flanged pipe-joints and non-conducting coverings therefor; and the invention consists in the construction, combination, and arrangement of parts substantially as shown and described, and particularly pointed out in the claims.

In the accompanying drawings, Figure 1 is a side view of the ends of two pipe-sections and a sectional elevation of the flanges uniting the same and constituting a pipe-joint and a sectional elevation of the coverings over both said pipes and the joint. Fig. 2 is a perspective view of the pipe-sections seen in Fig. 1 and the flanges thereon and of a portion of the plain covering as shown in Fig. 1. Fig. 3 is a perspective view of one of the sections of the joint-covering shown in Fig. 1.

The use of pipe-joints with flanges on the ends of the pipes for connecting them is now very common, and it frequently occurs that such joints have to be separated or opened for one reason or another, so that these joints are commonly united by means of screw-bolts. In all such cases the bolts uniting the flanges have to be removed lengthwise preliminary to the separation of the pipes. It likewise occurs very often that fires are kindled by or through flanges similar to these, and especially when exposed with highly-inflammable material about them. It is therefore designed by the present invention to provide a construction of covering which will make the joint fireproof and yet leave the connecting-bolts free to be removed without disturbing the non-conducting covering which is upon the pipes themselves and by merely removing the non-conducting covering from the flanges.

To these several ends the invention herein shown comprises, say, two pipes A and B and two flanges A' and B' thereon, preferably threaded or screwed upon said pipes and adjusted to come flush together, and tie-bolts $a$, binding the said flanges together. Suitable asbestos or other wrapping or covering C is shown on the pipe ends A, and this covering is generally of a permanent character, so that it cannot be removed without mutilation, unfitting it to be replaced. Generally also when the emergency arises and removal is necessary it is found that there is no other wrapping present to replace it, and this condition is always inconvenient and liable to be more or less serious in consequence. Hence I have conceived the idea of making a joint D in sections as a wholly separate part and form the same with necks $d$ and $d'$, adapted to overlap the pipe-covering C on both pipes A and B and with a special enlargement $d^2$ about its middle to encompass the flanges A' and B'. These joint-covering sections D are preferably uniform in size, and in this instance the neck $d$ is lengthened as compared with neck $d'$, so as to overlap cover C beyond the vacant bolt, removing chamber 2, which is deep enough to remove the bolts lengthwise. As the bolts $a$ ordinarily are made, they come relatively as near to the pipes A and B as is shown in Fig. 1, and the cover C is proportionally as thick as herein shown. Hence if the said cover C were brought up as near to the bolt A on the right as it is on the left in Fig. 1 the bolts could not be removed without breaking away the said cover C. I have therefore provided a construction which avoids the necessity of mutilating cover C to remove the bolts for separating the joint, and this I have accomplished by shortening the said cover upon that side of the flanges sufficiently to make chamber 2, within which to withdraw the bolts, and have lengthened the neck $d$ of the flange-cover D sufficiently to overlap the cover C, substantially as shown. This enables me to have free access to the pipe joints and bolts by simply releasing and laying aside the flange-cover sections, which are secured in place by removable bands or rings E, one or more being used upon each neck $d$ and $d'$. The said bands firmly bind the covering members D in position over the flanged joint and the extremities of pipes C. It will also be observed that the chamber 3 within the covering D, which incloses flanges A' and B', is narrowed laterally, so as to effectually cover the said flanges and bolts, and in this way the size of the covering is kept down within reasonable proportions and is not objectionable on account of the large space it will occupy.

Another feature of the covering or covering section or member D is its internal construction, which is not only cellular, but is constructed with alternate layers of paper and linings, and the said linings are fluted or corrugated lengthwise from end to end of the section, so as to form heat conducting and relieving channels, thus very materially contributing to the cooling of the joint-covering.

What I claim is—

1. A detachable covering for the joints and flanges of sections of covered pipes, comprising a casing with an enlarged central chamber having necks projecting from the ends thereof adapted to be inserted over the ends of the covered pipe-sections, and passages open from end to end of said casing by which a free circulation of air is established through the same, substantially as described.

2. A detachable covering for the joints and flanges of sections of pipes comprising a covering attached to the pipes, the covering on one pipe abutting against the flange thereof, while a space is left between the covering and flange of the other pipe for the purpose of allowing the withdrawing of the bolts from the flanges of the pipe-joints, an inclosing casing having air channels or passages open from end to end, and provided with end portions adapted to fit over the ends of said pipe-coverings, and an enlarged approximately central chamber, substantially as described.

Witness my hand to the foregoing specification this 8th day of January, 1902.

JOHN W. FARLEY.

Witnesses:
R. B. MOSER,
T. M. MADDEN.